United States Patent
March et al.

(10) Patent No.: US 7,297,903 B1
(45) Date of Patent: Nov. 20, 2007

(54) FASTER UNIVERSAL CONTACT TOASTER

(75) Inventors: Scott P. March, Lombard, IL (US); Michael Sutin, Skokie, IL (US)

(73) Assignee: A.J. Antunes & Company, Carol Stream, IL (US)

(*) Notice: Subject to any disclaimer, the term of this patent is extended or adjusted under 35 U.S.C. 154(b) by 0 days.

(21) Appl. No.: 11/581,551

(22) Filed: Oct. 16, 2006

Related U.S. Application Data (63) Continuation of application No. 10/822,420, filed on Apr. 12, 2004, now abandoned.

(60) Provisional application No. 60/462,129, filed on Apr. 11, 2003.

(51) Int. Cl.
| | | |
|---|---|---|
| A21B 1/22 | (2006.01) | |
| A21B 1/26 | (2006.01) | |
| A21B 1/48 | (2006.01) | |
| A47J 37/08 | (2006.01) | |
| F27B 9/36 | (2006.01) | |

(52) U.S. Cl. .................. 219/388; 219/400; 219/411; 99/386

(58) Field of Classification Search .................. None
See application file for complete search history.

(56) References Cited

U.S. PATENT DOCUMENTS

| | | | | |
|---|---|---|---|---|
| 3,835,760 A | * | 9/1974 | Rekesius | 99/331 |
| 4,164,591 A | * | 8/1979 | Ahlgren et al. | 426/523 |
| 4,281,594 A | * | 8/1981 | Baker et al. | 99/386 |
| 4,945,212 A | * | 7/1990 | Gogan et al. | 219/388 |
| 5,077,072 A | * | 12/1991 | Sieradzki | 426/523 |
| 5,673,610 A | * | 10/1997 | Stuck | 99/386 |
| 6,116,148 A | * | 9/2000 | Allen | 99/329 RT |
| 6,157,002 A | * | 12/2000 | Schjerven et al. | 219/388 |
| 6,192,789 B1 | * | 2/2001 | Agcaoili et al. | 99/349 |
| 6,201,218 B1 | * | 3/2001 | Chandler et al. | 219/388 |
| 6,223,650 B1 | * | 5/2001 | Stuck | 99/386 |
| 6,252,201 B1 | * | 6/2001 | Nevarez | 219/388 |
| 6,311,610 B1 | * | 11/2001 | Kettman | 99/386 |
| 6,595,117 B1 | * | 7/2003 | Jones et al. | 99/386 |
| 6,817,283 B2 | * | 11/2004 | Jones et al. | 99/386 |
| 6,933,473 B2 | * | 8/2005 | Henke et al. | 219/400 |

* cited by examiner

*Primary Examiner*—Joseph M. Pelham
(74) *Attorney, Agent, or Firm*—DLA Piper US LLP; R. Blake Johnston, Esq.

(57) ABSTRACT

A new toaster technology is provided for toasting food items. The toaster includes an inlet for receiving food items, an outlet for discharging the foot items after they are toasted and a toasting chamber located between the inlet and the outlet. In the preferred embodiment, the toasting chamber provides a toasting path for the food item during which the food item will be passed along two conveys—one vertical and one horizontal. Also, along the toasting path, the food item will be toasted by a platen heating surface, an impingement heating element and an infra-red heating element or a combination thereof.

44 Claims, 9 Drawing Sheets

FASTER UNIVERSAL CONTACT TOASTER

This application is a continuation of U.S. application No. 10/822,420, filed on Apr. 12, 2004, now abandoned which is hereby incorporated by reference in its entirety, which claims the benefit of U.S. Provisional application No. 60/462,129, filed Apr. 11, 2003.

FIELD OF INVENTION

The invention relates generally to devices for toasting food items such as sandwich buns, hamburger buns, bagels, muffins and the like and, more particularly, to an improved contact toaster that efficiently and completely toasts the food items quickly.

BACKGROUND

Toasted hamburger buns, bagels and muffins are highly valued by consumers for many reasons. For example, toasting a bun results in a caramelizing effect on its interior surface that provides a pleasing appearance and taste. This caramelizing effect also effectively seals the interior surfaces thereby preventing the absorption of juices from the meat and other ingredients, such as ketchup and mustard, into the bun. Accordingly, with the advent of fast-food restaurants that serve sandwiches, devices that efficiently toast a large number of buns in a very short period of time have become desirable.

In response to this demand, devices such as those disclosed in U.S. Pat. Nos. 4,261,257 to Henderson et al. and 4,530,276 to Miller have been developed. These toasting devices both feature a housing containing a platen having two opposed heating surfaces. Conveyor belts are positioned on opposite sides of the platen and are spaced therefrom. The two halves of a bun are inserted into inlets at the top of the housing so that they are received into the spaces between the platen and the conveyor belts. The conveyor belts in turn slide the internal surfaces of the bun halves across the platen so that they are toasted. When the bun halves reach the bottom of the conveyor belts, they are disposed upon a tray at the outlet of the housing.

While devices such as those disclosed in Henderson et al. and Miller have proven to be effective in the restaurant industry, they primarily provide only toasting of the interior surfaces of the bun halves. This is a disadvantage in that, for many reasons, it is desirable to toast the exterior surfaces (i.e. the top and bottom) of a bun as well as heat the bun body internally. Heating the bun exterior surfaces and body provides a softer and warmer overall quality to buns that consumers find pleasing. Heating the entire bun, as opposed to just the interior surfaces, also keeps the sandwich contents warmer longer.

In addition, if the food item toasted is something other than typical bun halves, toasting only one side may not be sufficient. For example, many restaurants serve double or triple-decker sandwiches that feature a bun middle section with two interior surfaces or faces. It would be clearly preferable to toast both of these faces. The same can be said for situations where, instead of typical bun halves, the food items being toasted are bread slices. Accordingly, a device that heats both sides and the body of food items would have greater effectiveness and versatility.

As a result, devices such as the one disclosed in U.S. Pat. No. 5,673,610 to Stuck have been developed. The device of Stuck includes the same features as the two patents discussed above but adds a pair of resistance-type auxiliary heaters that are positioned in proximity to the conveyor belts. While this addition allows both sides of a bun half or similar food item to be heated, the device still suffers from a number of limitations.

The auxiliary heaters of Stuck toast the exterior surfaces of a pair of bun halves by radiating heat through the wire conveyor belts. This occurs as the bun halves are slid along the centrally positioned platen. Accordingly, the interior surface of each bun half is heated by contact with the platen while the exterior surface of each bun half is heated by radiated heat from the auxiliary heaters. Any heating of the bodies of the bun halves, however, occurs only by conduction of the heat from the surfaces. As a result, the heating of the bodies of the bun halves is much less than optimal.

In addition, the arrangement of Stuck limits the temperature level of the auxiliary heaters. More specifically, if the temperature of the auxiliary heaters is set too high, the wire conveyor belts will heat up and burn the exterior surfaces of the bun halves. This results in burnt belt marks on the exterior surfaces of the buns which consumers find undesirable. Furthermore, in extreme cases, the wire conveyor belts could burn down deep so that the bun halves are unusable.

Limiting the temperature of the auxiliary heaters limits the speed at which the device may be operated. This is a very critical consideration in the fast-food industry—that industry depends on providing high quality products at extremely fast speeds. If the temperature of the auxiliary heaters could be increased without burning belt marks into the buns, the device could toast many more buns in a shorter period of time.

As many restaurants, including fast-food chains, have expanded their melt selections, a need has arisen for toasting devices that offer increased flexibility. More specifically, it is desirable that toasting devices accommodate thicker food items, such as muffins and bagels, in addition to the halves of sandwich buns.

The toasting devices of Henderson et al., Miller and Stuck suffer from limited flexibility in that they are able to accommodate only a narrow range of food item sizes. In each device, the spacing between the conveyor belts and the centrally positioned platen may be increased only slightly due to the size of the toasting device housing.

In response to the prior art difficulties, the present invention as well as the toasting devices of U.S. Pat. Nos. 6,192,782 and 5,960,704, both to Agcaoili and March, the contents of which are both herein incorporated by reference, were developed. Moreover, the present invention represents an improvement from other prior art because of the speed in which the present invention toasts the food items. As noted above, in the fast food industry, toasting speed is a critical element to the business of food production. The faster the toasting process, the more quickly customers are served. However, it is equally as important to maintain the high quality toasting standards.

The prior art devices, generally, sacrifice toasting speed for quality—once the devices try to attain a certain toasting speed, the quality declines. For example, in the prior art devices, to maintain the toast quality for hamburger or sandwich buns, the toasting process requires approximately 35 seconds (for bagels and muffins, the toasting process requires even more time). Where the speed was reduced to below 35 seconds, the buns do not demonstrate a "completely toasted quality," but rather the buns merely show a "browed" color. Such food items are not toasted thoroughly and never attain the caramelization necessary to seal the food item as described above. As such, prior art has not been able to develop a toaster device that can maintain the high quality of the slower processes at a high toasting speed.

Accordingly, it is an object of the present invention to provide an improved contact toaster that expediently toasts the interior and exterior surfaces of a food item.

It is another object of the present invention to provide an improved contact toaster that expediently and effectively heats a food item internally.

It is still another object of the present invention to provide an improved contact toaster that may expediently, efficiently and completely toast a large number of food items in a short amount of time.

It is still another object of the present invention to provide an improved contact toaster that may accommodate a wide variety of food item sizes.

SUMMARY OF THE INVENTION

The present invention is directed to an improved contact toaster for conveyorized toasting of bagels, sandwich buns, hamburger buns, muffins and similar food items that provides high quality, desirable toasted products at improved speeds. In particular, the present device provides for the toasting of food items of varying sizes and shapes at a much reduced speed over the prior art, but also maintains the high quality of the slower toasting devices. For instance, in one embodiment of the present invention, the toasting device can produce fully toasted hamburger/sandwich buns in under 17 seconds, fully toasted bagels in under 30 seconds and fully toasted muffins in under 50 seconds.

In this example embodiment of the present invention, the toasting device features a preferably steel or metal housing of varying dimensions having multiple inlets of varying size, for receiving the food items of various sizes and a preferably heated outlet or receiving area for discharging the foot items after they are toasted. This embodiment includes a toasting chamber that is located between the inlet and the outlet and may contain at least one, but preferably three conveyor belts. This embodiment also incorporates various electronic and mechanical controls, switches and other components including a drive system with an electric motor that activates the conveyor belts so that they may transport hamburger bun halves, bagels, muffins or other similar food items through the pathway.

DETAILED DESCRIPTION

Figure 1:
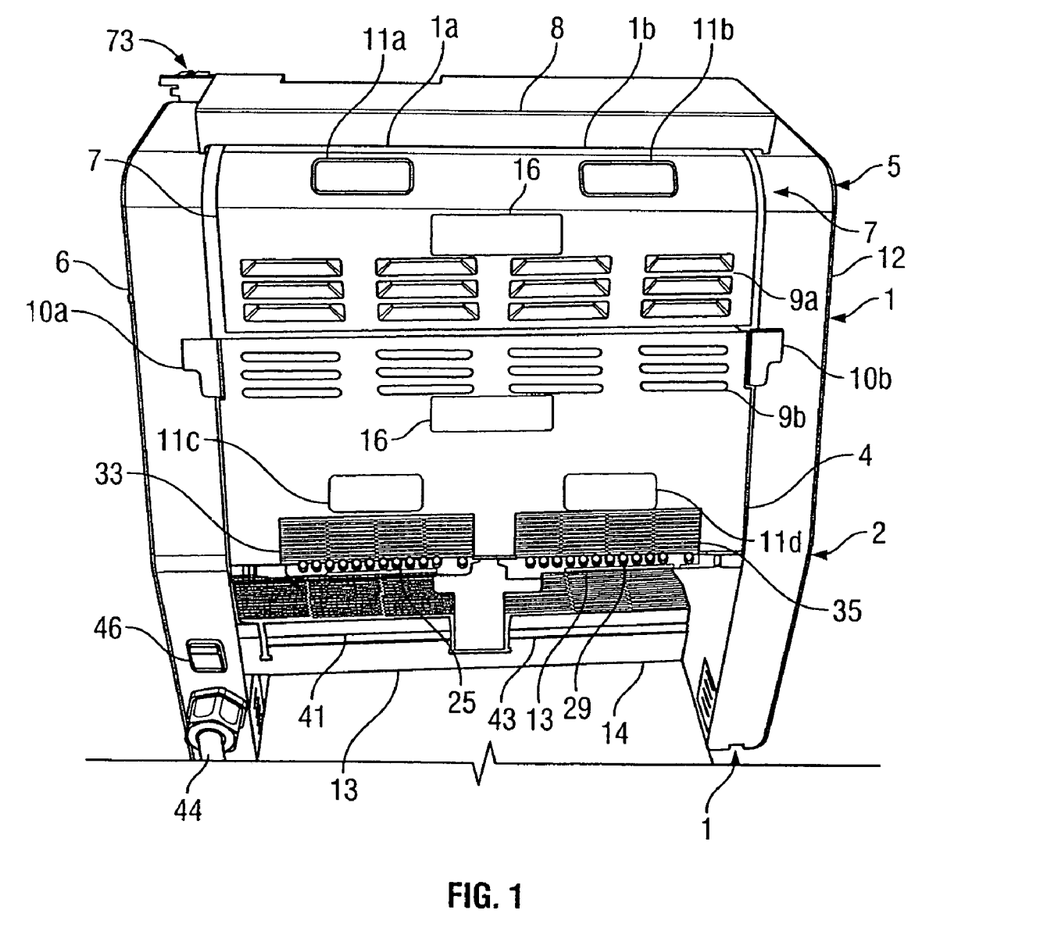
FIG. 1 is a back elevational view of an embodiment of the improved universal contact toaster.

FIG. 1 shows clearly the preferred embodiment of the improved universal contact toaster 1. The preferred embodiment of the toaster 1 is made of steel or some type of heat resistant metal. The toaster 1 has a back side 2 and, as seen clearly in FIGS. 3 and 4, a front side 3, a left side 6 and a right side 12, a top 8 and a bottom 14. The toaster 1 is energized by a power source (not shown) connected, preferably, by a cord 44 and an on/off switch 46.

Also in the preferred embodiment, the toaster 1 has both a lower panel 4 and an upper panel 5. In FIGS. 1-4, as shown, the upper panel 5 is in the closed position and the lower panel 4 is secured closed by fasteners 10a and 10b. However, the upper panel 5 can be manipulated open by gripping the upper panel 5 at the top 8 of the toaster 1 along the interior edge (not shown) of the upper panel 5 and moving the upper panel 5 in a downward direction at a hinge (not shown) to open the upper panel 5. In this manner, the user can manipulate, clean or fix the inner workings of the toaster 1. Also, both the lower panel 4 and the upper panel 5 include a series of vents 9a and 9b to prevent the toaster 1 from overheating.

As can be seen generally in FIGS. 1-4, the upper panel 5 in the preferred embodiment of the toaster 1 includes caution signs 16 (for user protection) and labels 11a, 11b, 11c and 11d to distinguish each inlet 13 so that a user does not attempt to put a food item 15 into the wrong inlet 13. As seen more clearly in FIGS. 5-8, the applicable markings 11a, 11b, 11c and 11d, identify the heel inlet 17 for insertion of the heel 19, the crown inlet 21 for insertion of the crown 23, the muffin inlet 25 for insertion of the muffin 27 and the bagel inlet 29 for insertion of the bagel 31. In addition, the labels reflect the correct orientation of the food item 15, where applicable, for insertion into the toaster 1. At the front of the inlets 25, 29 for the muffin 27 and bagel 31 is a flange 30a and 30b to support and guide the foot item 15 at the applicable inlet 13.

Again, as can be seen generally in FIGS. 1-4, and more clearly in FIGS. 5-8, in the preferred embodiment of the toaster 1, the muffin 27 and the bagel 31 enter their respective inlets 25 and 29 and move through the toaster 1. As is discussed in greater detail below, the food items 15 move through the toaster 1 by way of a left side horizontal conveyor 33, which, in the preferred embodiment, carries the heel 19 and the muffin 27, and a right side horizontal conveyor 35, which, in the preferred embodiment, carries the crown 23 and the bagel 29. In addition, with respect to only the heel 19 and crown 23, prior to moving onto the horizontal conveyors 33 and 35, these food items 15 enter their respective inlets 17 and 19 and move through the toaster 1 to the horizontal conveyors 33 and 35 by moving down the vertical conveyor 37.

As these food items 15 move through the toaster 1, particles may fall from a particular food item 15. The horizontal conveyors 33 and 35 and the vertical conveyor 37 are preferably made of interlocking material so as to allow the food particles to fall through rather than be stuck on the particular conveyor. In this manner, as can be seen clearly in FIG. 1, the particles fall onto a removable left side and right side tray 41 and 43. This provides a user easy and quick access to clean the toaster 1.

Figure 2:
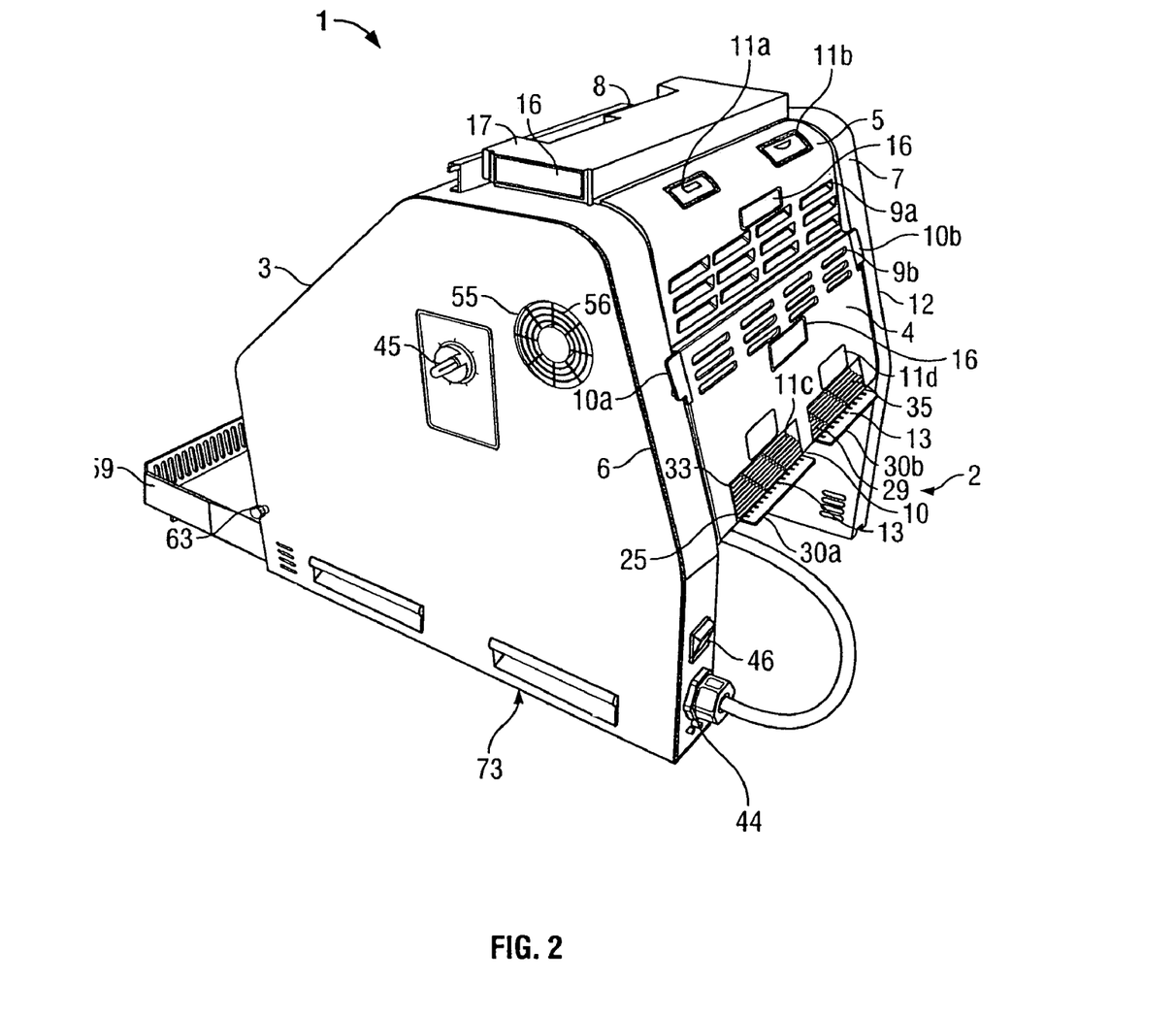
FIG. 2 is a left side perspective view of FIG. 1.
Figure 4:
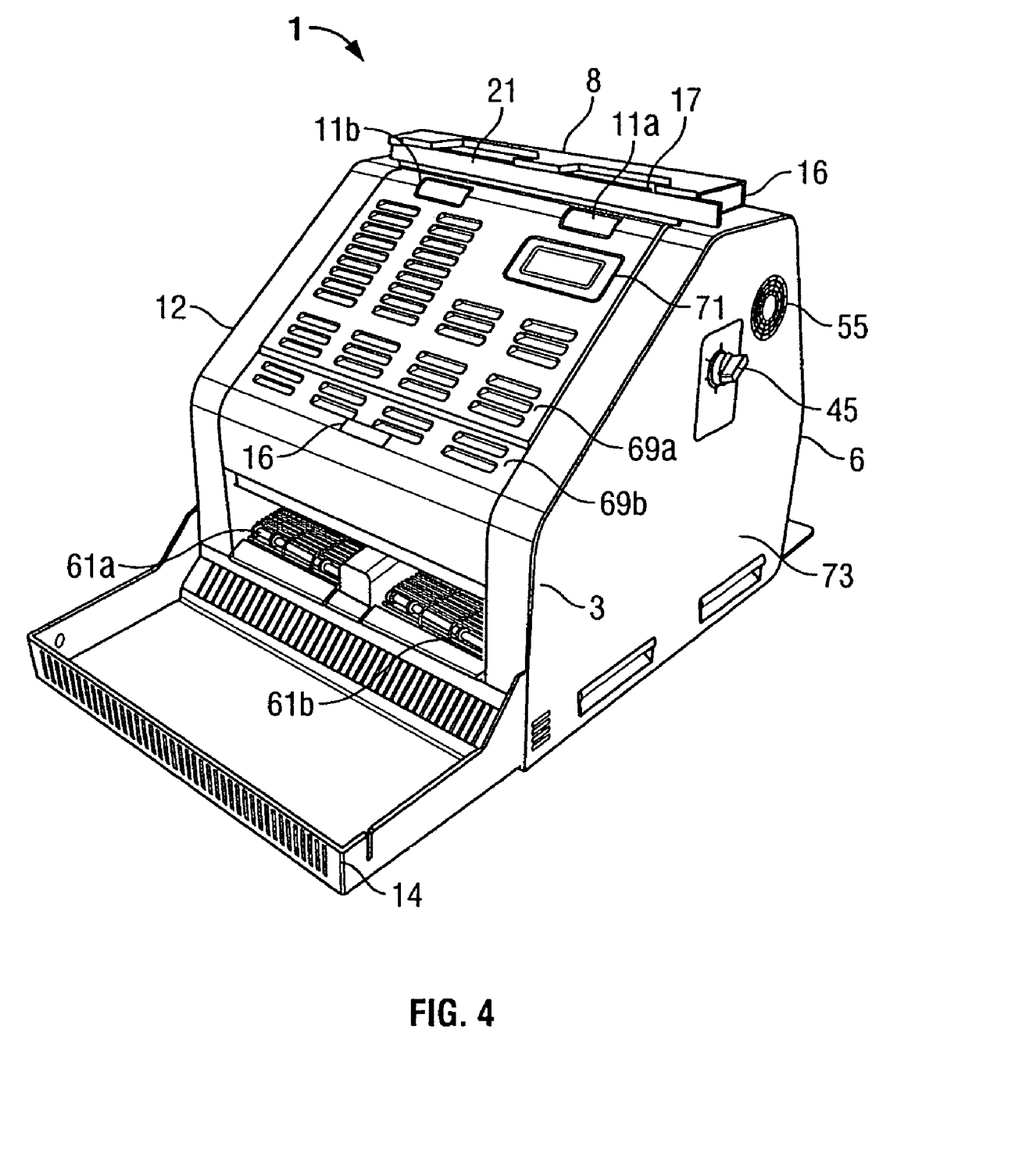
FIG. 4 is a left side perspective view of FIG. 2.

FIGS. 2 and 4 shows clearly the control knob 45 that adjusts the compression tension between the vertical conveyors 37 and the right and left grill platens 47 and 49. As will be discussed in greater detail below, heel inlet 17 and the crown inlet 21 are of different sizes since the food items 15 are of different widths; however, within each food item category, the widths may differ as well. For example, for one size hamburger a crown may be of a different size than the crown for a different hamburger. As such, in the preferred embodiment of the present invention, the control knob 45 can modulate the gap 51 and 53 (see FIGS. 5, 6) between each platen 47 and 49 and the vertical conveyor 37 and, therefore, apply more or less heat and pressure to the toasting food item 15. The control knob 45 controls a mechanism (not shown) which adjusts the location of the platens 47, 49 with respect to the vertical conveyor 37.

Also, FIGS. 2 and 4 illustrate the outer facing portion of the air blower 55 which can be seen through the blower vent 56. As can be seen more clearly in FIGS. 5-8, and discussed in additional detail below, the blower 55 will help apply impingement heat 105 to the food item 15 moving across the applicable horizontal conveyors 33 and 35. The blower 55 also keeps hot air 107 away from the electronics housing 57 so as to prevent the electrical controls (not shown) from overheating.

FIGS. 2-8 demonstrate the receiving tray 59 of the preferred embodiment of the toaster 1. As the food item 15 exists the toaster 1 through the outlets 61a and 61b, the food item 15 falls into the receiving tray 59. The receiving tray 59 is attached to the toaster 1 preferably by fasteners 63 (a seen in FIGS. 2-4). The receiving tray 59 also is heated. The heating source can be any one of a variety of means including, preferably, a foil heater (not shown) located within the receiving tray 59. In this manner, the food item 15 retains the heat and crunchiness provided to it during the toasting process even if the user does not quickly remove the food item 15 from the receiving tray 59.

Figure 3:
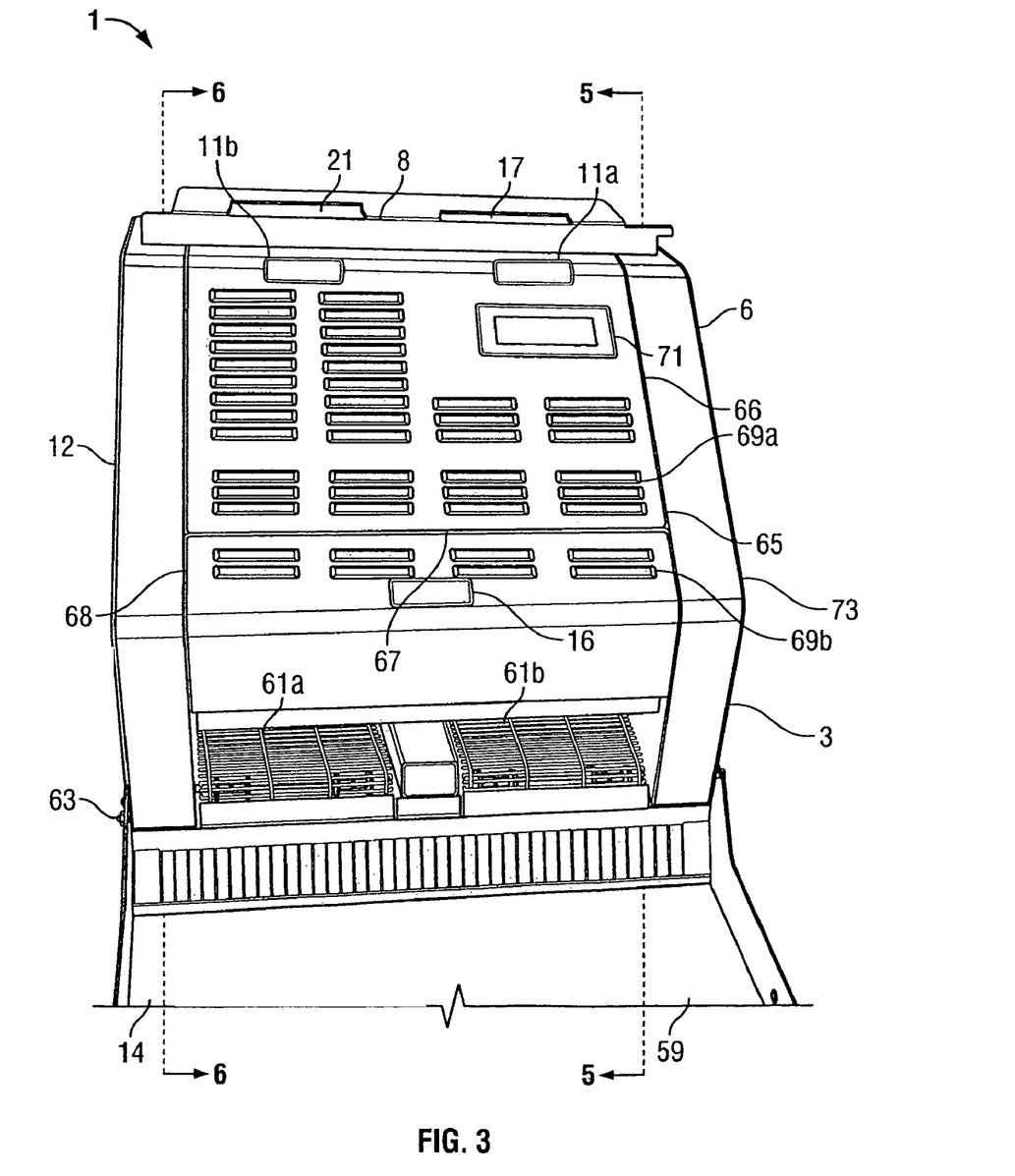
FIG. 3 a front elevational view of an embodiment of the improved universal contact toaster.

FIGS. 3 and 4 provide a clear illustration of the front side 3 of the toaster 1. In the preferred embodiment, the front side 3 includes a bifurcated from door 65, which a user may open to clean or fix the internal workings of the toaster 1. Similarly to the upper panel 5 on the back side 2, the front door 65, which has upper half 66 and lower half 68, can be opened by the user manipulating knob 67 of the front door 65 and manipulating the front door 65. The front door 65 preferably includes a series of vents 69a and 69b similar to the vents 9a and 9b to allow for air circulation within the toaster from overheating. The front side 3 also preferably includes a touch panel and a display 71 (however, other displays or monitors can be used), which can be used to control the change in the toaster 1 from breakfast mode to lunch mode (although other means to accomplish this change can be done including the manual operation of the toaster 1 by means of turning off the platens 47 and 49) and, in addition, provides information regarding the toaster 1 temperature, speed and general condition.

FIGS. 5-8 more clearly illustrate and distinguish the exterior 73 from the interior 75 of the toaster 1. For example, as mentioned, the toaster 1 has two specific modes, the lunch mode and the breakfast mode. During both the lunch mode and breakfast mode, all the heating elements of the invention are on; however, in other embodiments, to save energy, a user, for example, may turn off the platens 47 and 49 during the breakfast mode since they are not in use.

Figure 5:
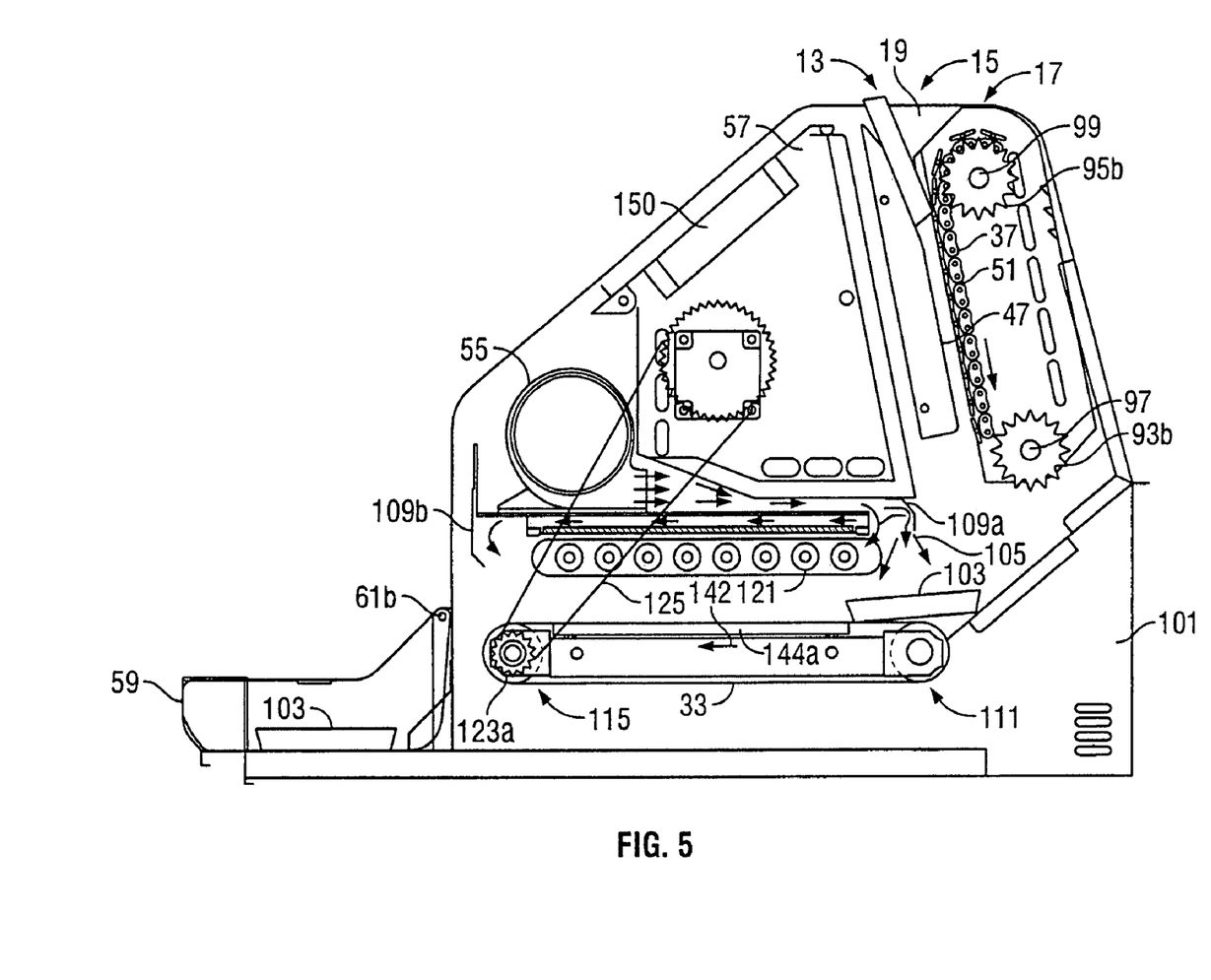
FIG. 5 is vertical cross-sectional view of the left side or heel loading lunch mode side of the improved universal contact toaster taken along line 5-5 of FIG. 3.
Figure 6:
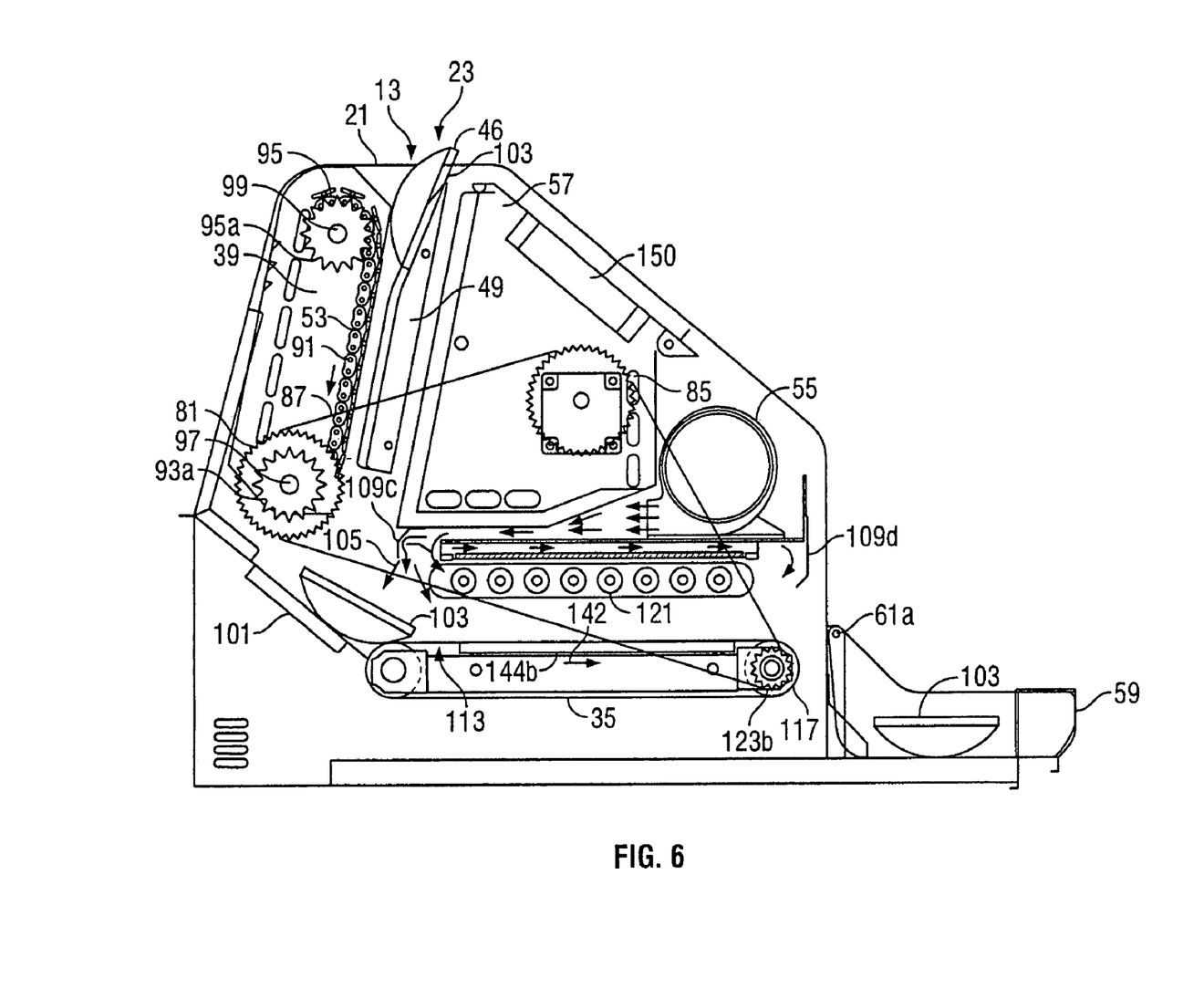
FIG. 6 is vertical cross-sectional view of the right side or crown loading lunch mode side of the improved universal contact toaster taken along line 6-6 of FIG. 3.

In general, during the lunch mode, the user will insert the heel 19 and the crown 23 into their respective inlets 13 at the top 8. As seen in FIGS. 5 and 6, during the lunch mode, the food items 15 are inserted into the inlets 13 and travel through the gap 51 and 53. The food items 15 moves through the gap 51 and 53 by way of the vertical conveyor 37. In the preferred embodiment, as seen clearly in FIGS. 6, 8 and 9, the vertical conveyor 37 has one large gear 81 that drives the conveyor 37. The gear 81 is connected to drive motor on the right side 85, but is not connected to the drive motor on the left side 83. In the preferred embodiment, the gear 81 is connected to the motor 83 by a chain 87. As seen most clearly in FIG. 9, the gear 81 turns the conveyor 37 through means of the axle 97, which spans the width of the interior 75 of the toaster 1.

Figure 9:
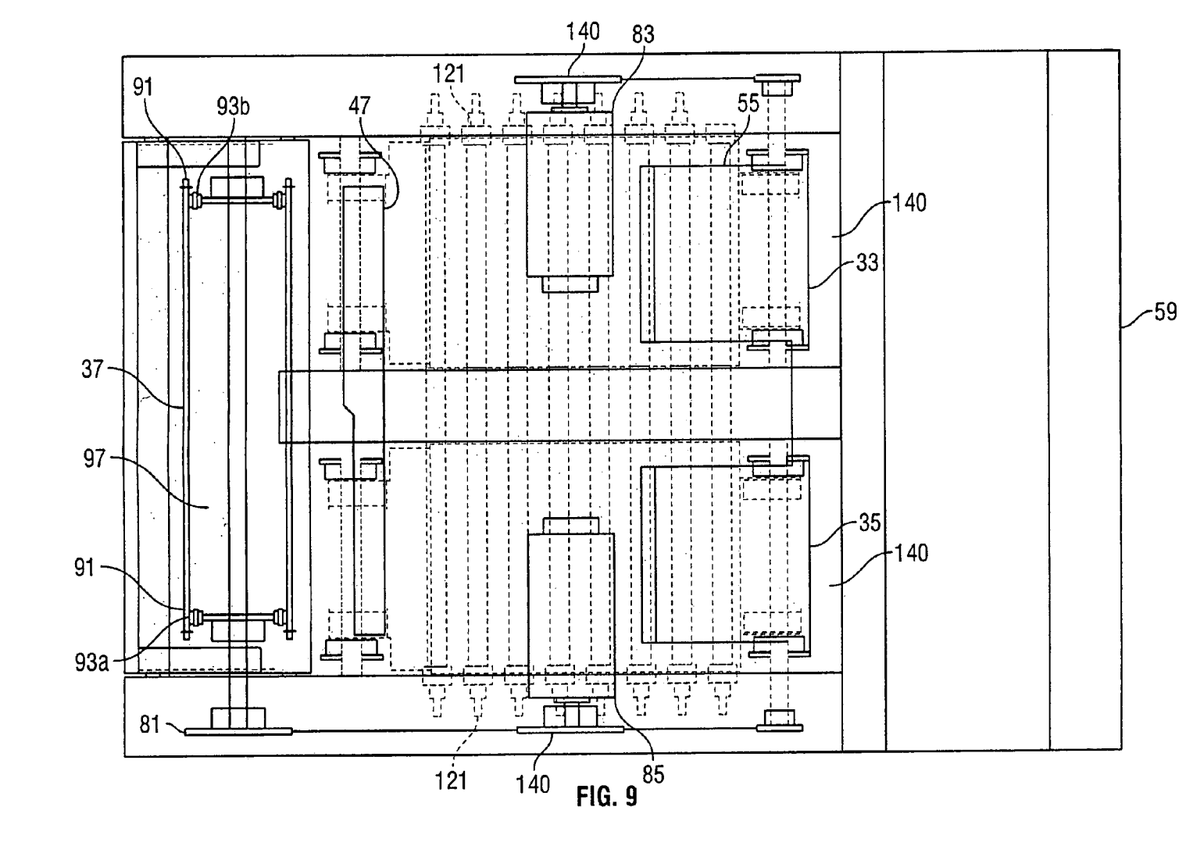
FIG. 9 is a top cross-sectional view of the interior of the improved universal contact toaster looking from the top downward.

The gear 81 drives four smaller gears 93a, 93b, 93c, 93d, via shafts 97, 99 and vertical conveyor chain 91. The vertical conveyor 37 is carried upon vertical conveyor chain 91. In this manner, as the food item 15 enters the inlets 13, it will be immediately conveyed down the vertical conveyor 37, across the applicable platen 47 and 49.

With respect to the platens 47 and 49, as can be seen clearly in FIGS. 5-8, the platen for the heel 47 is of a greater width or gap than that for the crown 49. As noted above, the basis for this differential is to allow the gaps 51 and 53 to vary based on the width of the narrow heel 19 versus that of the wider crown 23. However, in both instances, in the preferred embodiment, the heel 19 and the crown 23 fit snuggly against the respective platens 47 and 49 as the food items 15 travel down the vertical conveyor 37.

Figure 7:
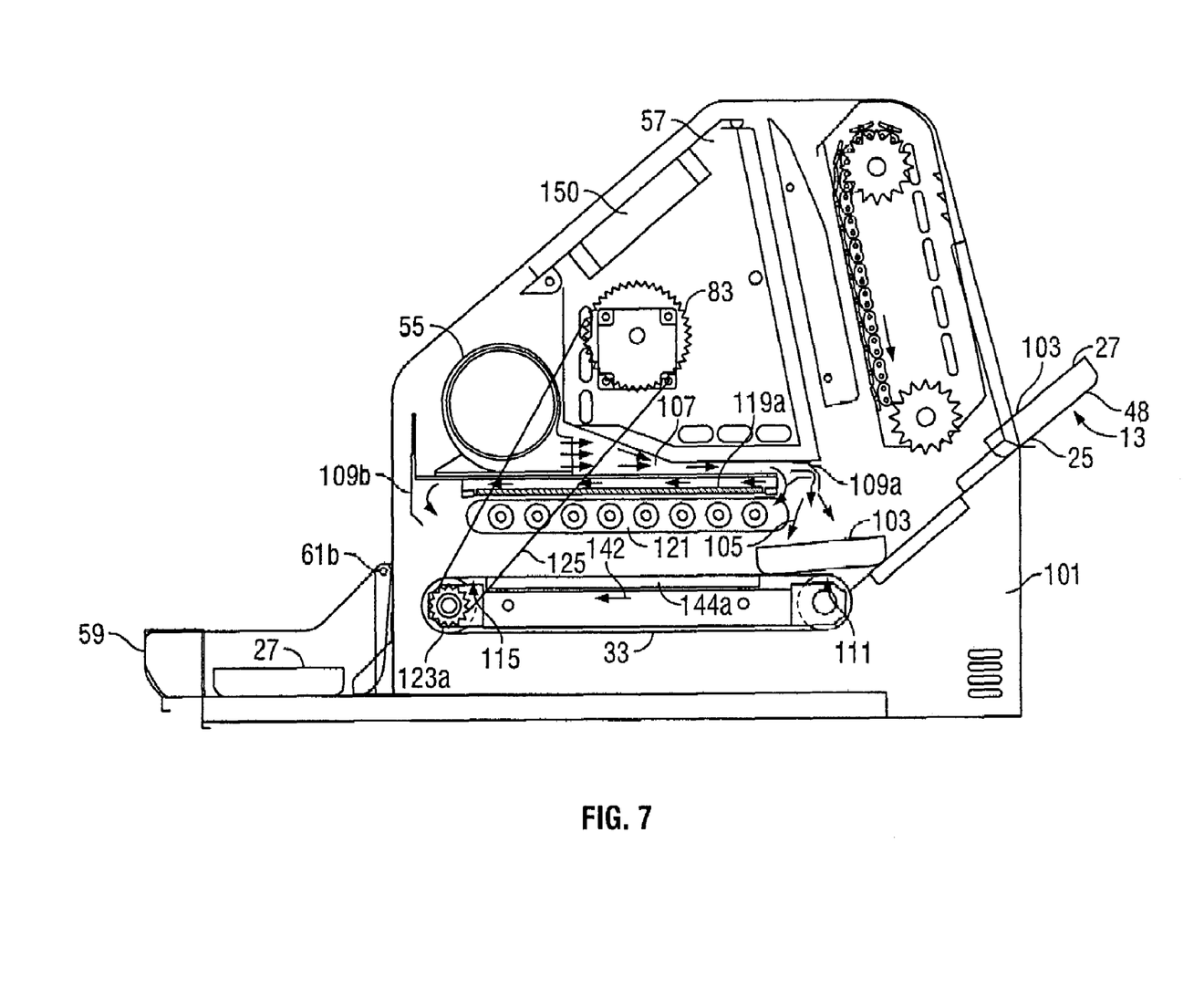
FIG. 7 is vertical cross-sectional view of the left side or muffin loading breakfast mode side of the improved universal contact toaster taken along line 5-5 of FIG. 3.
Figure 8:
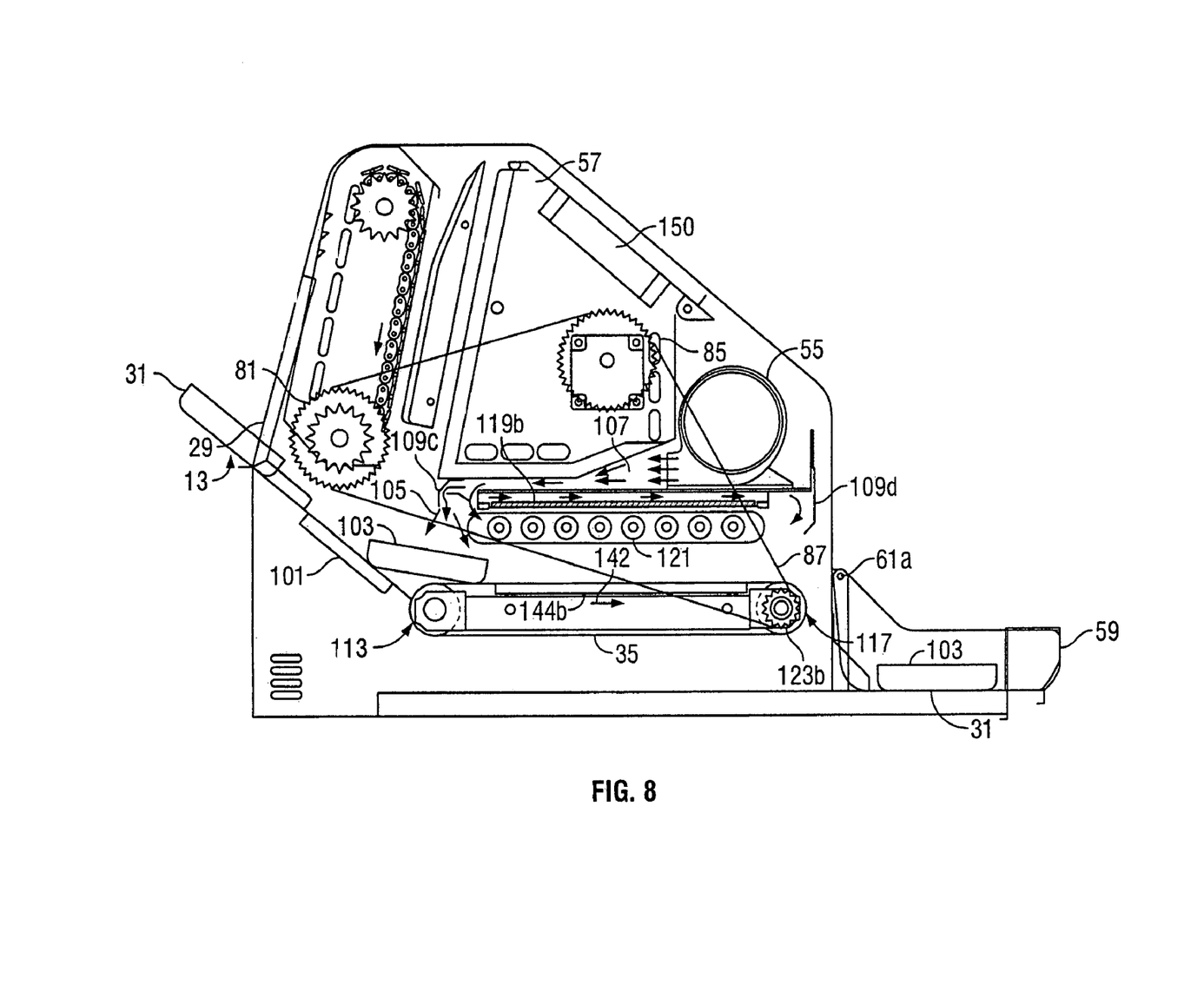
FIG. 8 is vertical cross-sectional view of the right side or bagel loading breakfast mode side of the improved universal contact toaster taken along line 6-6 of FIG. 3.

In the preferred embodiment, the platens 47 and 49 are heated by an embedded heating element (including, for example, calrods or other types of similar heating elements) cast into aluminum, bronze or other similar metals (not shown), but other methods may be used as well. The platens 47 and 49 essentially provide the first level of toasting for the heel 19 and the crown 23. However, the muffin 27 and the bagel 31 do not get toasted by the platens 47 and 49. Instead, as seen in FIGS. 7 and 8, as the muffin 27 and bagel 31 enter into the inlets 25 and 29, respectively, the foot items 15 immediately drop down a slide 101 and directly onto the applicable horizontal conveyors 33 and 35. Similarly, the heel 19 and crown 23 fall from the vertical conveyor 37 onto the slide 101 and then to the applicable horizontal conveyor 33 and 35. Moreover, in the preferred embodiment, the food item 15 is oriented so that each food item 15 lands with the face 103 facing the top 8 on the applicable horizontal conveyor 33 and 35.

As seen clearly in FIGS. 5-8, in the preferred embodiment, just as the food item 15 is transitioning from the slide 101 onto the applicable conveyor, its gets toasted by hot air impingement 105. The impingement heat 105 starts or, in the case of the heel 19 and crown 23, continues the toasting process of the foot item 15. The impingement heat dries and further heats the food items 15 to enhance the toasting characteristics. The impingement heat 105 is created by the blower 55 blowing air 107 away from the electronics 57 and towards the foot item 15 coming down the slide 101. The impingement air 105 hits the food item at both the beginning of the horizontal conveyor 111 and 113 and the end of the conveyor 115 and 117. In the preferred embodiment, baffles 109a, 109b, 109c and 109d keep the impingement air 105 from escaping and, instead, directs the impingement heat 105 toward the foot item 15 at the beginning 111 and 113 and end 115 and 117 of the horizontal conveyors. Moreover, the impingement air 105 is warm as it comes from the blower 55, but is further heated by the reflects 119a and 119b, which are preferably made from heat conducting metals or alloys, and reflect the heat given by the infrared heaters 121, which are discussed in greater detail below.

In general, in the preferred embodiment of the invention, there are two horizontal conveyors 33 and 35 because the breakfast food items move at different speeds from the lunch food items and, in this manner, as necessary or useful, the user can regulate the speed of the horizontal conveyors 33 and 35 through the display 71, as discussed above. Moreover, the horizontal conveyors 33 and 35 are energized similarly to the vertical conveyor 37 as described above. In particular, in the preferred embodiment, as can be seen clearly in FIGS. 5-9, the toaster 1 has the two drive motors 83 and 85 connected to the horizontal conveyors 33 and 35. In both the breakfast 79 and lunch 77 modes, the horizontal conveyors 33 and 35 are activated so the motors 83 and 85 rotate the horizontal conveyors 33 and 35 by a connection to a gear 123a and 123b in the back end portion 113 and 115 of the applicable horizontal conveyor 33 and 35. Again, the gears 123a and 123b are connected to the motor 83 and 85 by the chain 87 identified above or, as applicable depending on the conveyor, the second chain 125. As seen most clearly in FIG. 9, the horizontal conveyors 33 and 35 have a series of standard gears and axles (seen generally at) 140 the move the conveyor belt itself.

The food item 15 will move across the applicable horizontal conveyor 33 and 35 in a direction 142 toward the receiving tray 59. As the food item 15 moves across the applicable horizontal conveyor 33 and 35, it is blasted with heat from the infrared heaters 121 (which can produce heat from a variety of means including, open wire, calrod, quartz or similar materials) that will further toast the food items 15 to imbue them with the thickness, crunchiness and coloring associated with high quality toasted products. This infra-red heaters 121 preferably will be controlled with watt regulation without temperature compensation; however, in other embodiments, temperature compensation may be used to control chamber temperature. In addition, underneath the horizontal conveyor belts 33 and 35, are metal plates 144a and 144b which reflect heat from the infrared heaters 121 onto the food items 15 for further toasting. In the preferred embodiment, there are 8 infrared heaters; however, more or less may be used. The infrared heaters 121, and the metal plates 144a and 144b cook the food items 15 to get that additional crispness, caramelization and/or browning just before the food items 15 exit the toaster 1 through the outlets 61a and 61b into the receiving tray 59. As noted above, as the food items 15 exit the toaster 1, the food items 15 also receive another blast of the impingement heat 105.

It will also be appreciated that the speed of the various conveyors is controlled by the electronic controller 150 which regulates the speed of the motors 83, 85.

The invention claimed is:

1. An apparatus for toasting food items comprising:
   an inlet for receiving food items;
   an outlet for discharging the food items after they are toasted;
   a toasting chamber located between the inlet and the outlet, the toasting chamber defining at least one toasting path, the toasting chamber having at least one platen arranged along the path, at least one conveyor extending along the path, a means for impingement heating located along the path, and at least one infra-red heating element disposed along the path;
   said at least one platen being positioned sequentially along the path with said at least one infra-red heating element so that food items traveling along the path are exposed to said at least one platen and said at least one infra-red heating element individually; and
   a means for activating and controlling the conveyor to move the food items through the path.

2. The apparatus of claim 1 wherein the apparatus includes a housing.

3. The apparatus of claim 2 wherein there is more than one inlet.

4. The apparatus of claim 3 wherein there are two horizontal inlets at the rear of the housing and the path includes a horizontal portion, the two inlets each coupled to horizontal portion of the path.

5. The apparatus of claim 2 wherein the means for impingement heating includes a fan encased within the housing, the fan adapted to blow air across the path, and a metal reflector is arranged adjacent the infra-red heating element so that the reflector radiates heat and warms the air as it blows across the path.

6. The apparatus of claim 5 further comprising at least one baffle which directs the blowing air across the food item and the conveyor belt so as to further toast the food item and prevent heat loss.

7. The apparatus of claim 1 further comprising a receiving tray coupled to the outlet and wherein the receiving tray includes a foil heater plate to retain the heat in the food item.

8. The apparatus of claim 1 wherein, the toasting chamber defines two toasting paths, the toasting chamber having a platen arranged along each of the paths.

9. The apparatus of claim 8 wherein the apparatus includes a first inlet and second inlet for receiving food items, each inlet includes a respective platen arranged along the respective path, the first inlet has a first dimensions and the second inlet has a second dimension different from the first dimension so as to allow for different size food products to move across the respective platen surfaces.

10. The apparatus of claim 9 wherein the platens will be heated by an embedded heating element.

11. The apparatus of claim 1 wherein there are eight infrared heating elements.

12. The apparatus of claim 1 wherein the means for activating and the controlling the conveyor includes a motor with gears of differing sizes, and means for regulating the speed of the motor, so as to move the attached conveyor belts at differing speeds.

13. An apparatus for toasting food items comprising:
   a housing including at least two vertical inlets at the top of the housing to accept food items of differing size and shapes, and an outlet for discharging the food items after they are toasted;
   a toasting chamber located between the inlet and the outlet, the toasting chamber defining at least one toasting path, the toasting chamber having at least one platen arranged along the path, at least one conveyor extending along the path, a means for impingement heating located along the path, and at least one infra-red heating element disposed along the path;
   said pathway including a vertical portion where the two inlets are each coupled to a vertical portion of the pathway; and
   a means for activating and controlling the conveyor to move the food items through the path.

14. An apparatus for toasting food items comprising:
   a housing including two horizontal inlets in a rear of the housing and an outlet for discharging the food items after they are toasted;
   a toasting chamber located between the inlet and the outlet, the toasting chamber of defining at lest one toasting path, the toasting chamber having at least one platen arranged along the path, at least one conveyor extending along the path, a means for impingement heating located along the path, and at least one infra-red heating element disposed along the path;

said pathway including a horizontal portion where the two horizontal inlets are each coupled to the horizontal portion of the pathway and allow for the loading of muffins and bagels into the housing and onto the conveyor so as to avoid the at least platen; and a means for activating and controlling the conveyor to move the food items through the path.

15. An apparatus for toasting food items comprising:

an inlet for receiving food items;

an outlet for discharging the food items after they are toasted;

a toasting chamber located between the inlet and the outlet, the toasting chamber defining at least one toasting path, the toasting chamber having at least one platen arranged along the path, two horizontal wire conveyors and one vertical wire conveyor extending along the path, a means for impingement heating located along the path, and at least one infra-red heating element disposed along the path;

a metal plate inserted adjacent the horizontal wire conveyors to reflect and radiate heat from the infra-red heaters onto the food items; and a means for activating and controlling the conveyor to move the food items through the path.

16. An apparatus for toasting food items comprising:

an inlet for receiving food items;

an outlet for discharging the food items after they are toasted;

a toasting chamber located between the inlet and the outlet, the toasting chamber defining at least one toasting path, the toasting chamber having at least one platen arranged along the path, at least one conveyor extending along the path, a means for impingement heating located along the path, and at least one infra-red heating element disposed along the path; and a means for activating and controlling the conveyor to move the food items through the path including two motors with gears of differing sizes, and means for regulating the speed of the motors, so as to move the attached conveyor belts at differing speeds.

17. An apparatus for toasting food items comprising:

a housing including at least two vertical inlets at the top of the housing to accept food items of differing size and shapes and an outlet for discharging the foot items after they are toasted;

a toasting chamber located between the inlet and the outlet, the toasting chamber defining at least one toasting path, the toasting chamber having at least one conveyor extending along the path, at least one platen extending along the path, and a means for impingement heating of the food items disposed therein;

said pathway including a vertical portion where the two inlets are each coupled to the vertical portion of the pathway; and a means for activating and controlling the conveyor belt to move the food items through the path.

18. The apparatus of claim 17 further comprising a receiving tray coupled to the outlet and wherein the receiving tray includes a foil heater plate to retain the heat in the food item.

19. The apparatus of claim 17 wherein the means for activating and controlling the conveyor includes a motor with gears of differing sizes, and means for regulating the speed of the motor, so as to move the attached conveyor belts at differing speeds.

20. An apparatus for toasting food items comprising:

a housing including two horizontal inlets in a rear of the housing and an outlet for discharging the foot items after they are toasted;

a toasting chamber located between the inlet and the outlet, the toasting chamber defining at least one toasting path, the toasting chamber having at least one conveyor extending along the path, at least one platen extending along the path, and a means for impingement heating of the food items disposed therein;

said pathway including a horizontal portion where the two horizontal inlets are each coupled to the horizontal portion of the pathway and allow for the loading of muffins and bagels into the housing and onto the conveyor so as to avoid the at least one platen; and a means for activating and controlling the conveyor belt to move the food items through the path.

21. An apparatus for toasting food items comprising:

an inlet for receiving food items;

an outlet for discharging the foot items after they are toasted;

a toasting chamber located between the inlet and the outlet, the toasting chamber defining at least one toasting path, the toasting chamber having two horizontal wire conveyors and one vertical wire conveyor extending along the path, at least one platen extending along the path, and a means for impingement heating of the food items disposed therein:

a metal plate inserted adjacent the horizontal wire conveyors to reflect and radiate heat from an infra-red heater element onto the foot item; and a means for activating and controlling the conveyor belt to move the food items through the path.

22. The apparatus of claim 21 wherein the apparatus includes a housing.

23. The apparatus of claim 21 wherein there is more than one inlet.

24. The apparatus of claim 23 wherein there are at least two vertical inlets at the top of the housing to accept food items of differing size and shapes, the two inlets each coupled to a vertical portion of the pathway.

25. The apparatus of claim 23 wherein there are two horizontal inlets at the rear of the housing and the path includes a horizontal portion, the two inlets each coupled to the horizontal portion of the path.

26. The apparatus of claim 21 wherein, the toasting chamber defines two toasting paths, the toasting chamber having a platen arranged along each of the paths.

27. The apparatus of claim 26 wherein the apparatus includes a first inlet and second inlet for receiving food items, each inlet includes a respective platen arranged along the respective path, the first inlet has a first dimension and the second inlet has a second dimension different from the first dimension so as to allow for difference size food products to move across the respective platen surfaces.

28. The apparatus of claim 27 wherein the platen will be heated by an embedded heating element.

29. The apparatus of claim 21 wherein the means for impingement heating includes a fan encased within the housing, the fan adapted to below air across the path, and a metal reflector is arranged adjacent the infra-red heating element so that the reflector radiates heat and warms the air as it blows across the path.

30. The apparatus of claim 29 further comprising at least one baffle which directs the blowing air across the food item and the conveyor belt so as to further toast the food item and prevent heat loss.

31. An apparatus for toasting food items comprising:
an inlet for receiving food items;
an outlet for discharging the food items after they are toasted;
a toasting chamber located between the inlet and the outlet, the toasting chamber defining at least one toasting path, the toasting chamber having at least one conveyor extending along the path, at least one platen extending along the path, and a means for impingement heating of the food items disposed therein; and
a means for activating and controlling the conveyor belt to move the food items through the path including two motors with gears of differing sizes, and means for regulating the speed of the motors, so as to move the attached conveyor belts at differing speeds.

32. An apparatus for toasting food items comprising:
an inlet for receiving food items;
an outlet for discharging the foot items after they are toasted;
a toasting chamber located between the inlet and the outlet, the toasting chamber defining at least one toasting path, the toasting chamber having at least one platen arranged along the path, at least one conveyor extending along the path, and at least one infra-red heating element disposed along the path;
said at least one platen being positioned sequentially along the path with said at least one infra-red heating element so that food items traveling along the path are exposed to said at least one platen and said at least one infra-red heating element individually; and
a means for activating and controlling the conveyor to move the food items through the path.

33. The apparatus of claim 32 wherein the apparatus includes a housing.

34. The apparatus of claim 32 wherein there is more than one inlet.

35. The apparatus of claim 34 wherein there are two horizontal inlets an the rear of the housing and the path includes a horizontal portion, the two inlets each coupled to the horizontal portion of the path.

36. The apparatus of claim 32 further comprising a receiving tray coupled to the outlet and wherein the receiving tray includes a foil heater plate to retain the heat in the food item.

37. The apparatus of claim 32 wherein, the toasting chamber defines two toasting paths, the roasting chamber having a platen arranged along each of the paths.

38. The apparatus of claim 37 wherein the apparatus includes a first inlet and second inlet for receiving food items, each inlet includes a respective platen arranged along the respective path, the first inlet has a first dimension and the second inlet has a second dimension different from the first dimension so as to allow for different size food products to move across the respective platen surfaces.

39. The apparatus of claim 38 wherein the platens will be heated by an embedded heating element.

40. The apparatus of claim 32 wherein there are 8 infrared heating elements.

41. The apparatus of claim 32 wherein the means for activating and controlling the conveyor includes a motor with gears of differing sizes, and means for regulating the speed of the motor, so as to move the attached conveyor belts at differing speeds.

42. An apparatus for toasting food items comprising:
a housing including two horizontal inlets in a rear of the housing and an outlet for discharging the food items after they are toasted;
a toasting chamber located between the inlet and the outlet, the toasting chamber defining at least one toasting path, the toasting chamber having at least one platen arranged along the path, at least one conveyor extending along the path, and at least one infra-red heating element disposed along the path;
said pathway including a horizontal portion where the two horizontal inlets allow for the loading of muffins and bagels into the housing and onto a conveyor so as to avoid the at least one platen; and
a means for activating and controlling the conveyor to move the food items through the path.

43. An apparatus for toasting food items comprising:
an inlet for receiving food items;
an outlet for discharging the foot items after they are toasted;
a toasting chamber located between the inlet and the outlet, the toasting chamber defining at least one toasting path, the toasting chamber having at least one platen arranged along the path, two horizontal wire conveyors and one vertical wire conveyor extending along the path, and at least one infra-red heating element disposed along the path;
a metal plate inserted adjacent the horizontal wire conveyors to reflect and radiate heat from the infra-red heaters onto the food items; and
a means for activating and controlling the conveyor to move the food items through the path.

44. An apparatus for toasting food items comprising:
an inlet for receiving food items;
an outlet for discharging the food items after they are toasted;
a toasting chamber located between the inlet and the outlet, the toasting chamber defining at least one toasting path, the toasting chamber having at least one platen arranged along the path, at least one conveyor extending along the path, and at least one infra-red heating element disposed along the path; and
a means for activating and controlling the conveyor to move the food items through the path including two motors with gears of differing sizes, and means for regulating the speed of the motors so as to move the attached conveyor belts at differing speeds.

* * * * *